United States Patent
Shen et al.

(10) Patent No.: US 10,917,341 B2
(45) Date of Patent: Feb. 9, 2021

(54) FORWARDING PATH SELECTION METHOD AND DEVICE

(71) Applicant: Huawei Technologies Co., Ltd., Shenzhen (CN)

(72) Inventors: Li Shen, Nanjing (CN); Hong Zhou, Nanjing (CN); Heyang Liu, Nanjing (CN); Peng Dong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/441,919

(22) Filed: Jun. 14, 2019

(65) Prior Publication Data
US 2019/0327172 A1 Oct. 24, 2019

Related U.S. Application Data

(63) Continuation of application No. PCT/CN2017/115630, filed on Dec. 12, 2017.

(30) Foreign Application Priority Data

Dec. 16, 2016 (CN) .......................... 2016 1 1169158

(51) Int. Cl.
*H04L 12/721* (2013.01)
*H04L 12/26* (2006.01)

(52) U.S. Cl.
CPC .......... *H04L 45/70* (2013.01); *H04L 43/0876* (2013.01); *H04L 45/38* (2013.01)

(58) Field of Classification Search
CPC ....... H04L 12/721; H04L 12/26; H04L 45/70; H04L 43/0876; H04L 45/38
See application file for complete search history.

(56) References Cited

U.S. PATENT DOCUMENTS 8,789,135 B1 * 7/2014 Pani .................... H04L 63/0209
370/229
9,036,481 B1 5/2015 White
(Continued)

FOREIGN PATENT DOCUMENTS

CN 103346971 A 10/2013
CN 105591974 A 5/2016
(Continued)

OTHER PUBLICATIONS

Foreign Communication From a Counterpart Application, European Application No. 17880912.5, Extended European Report dated Oct. 14, 2019, 10 pages.
(Continued)

*Primary Examiner* — Chi Ho A Lee
(74) *Attorney, Agent, or Firm* — Conley Rose, P.C.

(57) ABSTRACT

A forwarding path selection method and device are disclosed. If a data packet to be sent to a target device is a start packet of a flowlet in which the data packet is located, a sender device selects a low-load path from a plurality of paths to forward the data packet, and sets a forwarding decision of a flow in which the data packet is located to the selected path, where load of each path is load of traffic received by a corresponding intermediate device from the sender device or load of traffic sent by a corresponding intermediate device to the target device, whichever is higher. Flowlet-based load balancing can be implemented only by providing related functions on one type of device.

20 Claims, 4 Drawing Sheets

(56) References Cited

U.S. PATENT DOCUMENTS

| | | | |
|---|---|---|---|
| 2005/0259632 A1* | 11/2005 | Malpani | H04L 67/1012 370/351 |
| 2011/0007660 A1 | 1/2011 | Bae | |
| 2011/0213893 A1* | 9/2011 | Morris | H04L 69/163 709/232 |
| 2013/0100808 A1* | 4/2013 | Doron | H04L 47/125 370/235 |
| 2015/0003230 A1* | 1/2015 | Mitsumori | H04L 45/22 370/218 |
| 2015/0124611 A1 | 5/2015 | Attar et al. | |
| 2015/0127797 A1 | 5/2015 | Attar et al. | |
| 2015/0271060 A1* | 9/2015 | Kishimoto | H04L 45/22 709/218 |
| 2015/0271061 A1* | 9/2015 | Byun | H04L 45/7453 370/392 |
| 2016/0050156 A1* | 2/2016 | Bergeron | H04L 47/41 370/235 |
| 2017/0134186 A1* | 5/2017 | Mukundan | H04L 67/02 |
| 2018/0062950 A1* | 3/2018 | Baldi | H04L 43/026 |

FOREIGN PATENT DOCUMENTS

| | | |
|---|---|---|
| CN | 105933232 A | 9/2016 |
| JP | 2012501566 A | 1/2012 |

OTHER PUBLICATIONS

Machine Translation and Abstract of Chinese Publication No. CN105591974, May 18, 2016, 47 pages.

Alizadeh, M., et al, "CONGA: Distributed Congestion-Aware Load Balancing for Datacenters," SIGCOMM'14, Aug. 17-22, 2014, Chicago, IL, USA, 12 pages.

Foreign Communication From a Counterpart Application, PCT Application No. PCT/CN2017/115630, English Translation of International Search Report dated Feb. 27, 2018, 2 pages.

Foreign Communication From a Counterpart Application, PCT Application No. PCT/CN2017/115630, English Translation of Written Opinion dated Feb. 27, 2018, 5 pages.

* cited by examiner

FORWARDING PATH SELECTION METHOD AND DEVICE

CROSS-REFERENCE TO RELATED APPLICATIONS

This application is a continuation of International Application No. PCT/CN2017/115630, filed on Dec. 12, 2017, which claims priority to Chinese Patent Application No. 201611169158.7, filed on Dec. 16, 2016. The disclosures of the aforementioned applications are hereby incorporated by reference in their entireties.

TECHNICAL FIELD

This disclosure relates to the communications field, and in particular, to a forwarding path selection method and device.

BACKGROUND

When receiving a packet, a network device (for example, a network switch or a router) forwards the packet to a destination of the packet. If there are a plurality of optional paths to the destination, the network device may select one of the paths and use the path to send the packet. However, in typical flow-based path selection, a path is selected for each flow. Therefore, all packets in the flow pass through the same path. If a same path is selected for a plurality of flows with heavy traffic, the path may be congested, but other paths may be still idle. Conversely, in packet-based path selection, a path is selected for each packet. Therefore, packets in a flow pass through different paths. Although load balancing is easily implemented by the packet-based path selection, delays of packets passing through different paths are different, and a destination may first receive a packet that is sent later by a sender device, and then receive a packet that is sent earlier by the sender device.

SUMMARY

This disclosure provides a forwarding path selection method and device to optimize path selection. The disclosure is defined by the attached claims.

According to a first aspect, a forwarding path selection method is provided and includes: receiving, by a sender device, a data packet to be sent to a target device; and if the data packet is a start packet of a flowlet in which the data packet is located, selecting, by the sender device, a low-load path from a plurality of paths to forward the data packet, and setting a forwarding decision of a flow in which the data packet is located to the selected path. If the data packet is the start packet of the flowlet in which the data packet is located, the flowlet is a new flowlet. If the data packet is a start packet of the flow in which the data packet is located, the data packet is also the start packet of the flowlet in which the data packet is located, and therefore the flowlet is a new flowlet. In addition, the flowlet in which the data packet is located is a first flowlet of the flow in which the data packet is located. If an interval between the data packet and a previous data packet of the flow in which the data packet is located is longer than an invalid duration (the invalid duration is an interval that is sufficiently long to separate two data packets to different flowlets), the flowlet in which the data packet is located is different from a flowlet in which the previous data packet is located. Therefore, the flowlet in which the data packet is located is a new flowlet.

Each of the plurality of paths connects the sender device to the target device via one of a plurality of intermediate devices. Load of each of the plurality of paths is load of traffic received by a corresponding intermediate device from the sender device or load of traffic sent by a corresponding intermediate device to the target device, whichever is higher. Load of traffic received by the plurality of intermediate devices from the sender device is measured by the sender device. Load of traffic sent by the plurality of intermediate devices to the target device is measured by the target device.

Types of the sender device and the target device are usually different from types of the intermediate devices. Because a packet is sent from one network device to another network device, a quantity of packets sent by one network device is equal to a quantity of packets received by another network device. The target device measures that load of traffic received from an intermediate device is equal to load of traffic sent by the intermediate device to the target device. Therefore, the target device may measure the load, and the intermediate device is only responsible for forwarding. A flowlet-based load balancing function can be implemented only by providing related functions on one type of device.

With reference to the first aspect, in a first implementation of the first aspect, the method further includes: if the forwarding decision of the flow is invalid, determining that the data packet is the start packet of the flowlet in which the data packet is located; and if the sender device does not receive any data packet of the flow within an invalid duration after the data packet is received, invalidating, by the sender device, the forwarding decision of the flow. The forwarding decision of the flow is invalidated when the sender device does not receive any data packet within the invalid duration, so that the sender device does not need to calculate an interval between two data packets every time a data packet is received. This reduces calculation of the sender device.

With reference to the first implementation of the first aspect, in a second implementation of the first aspect, the method further includes: after selecting the path for forwarding the data packet, setting, by the sender device, a validity flag of the forwarding decision of the flow to "valid".

With reference to any one of the first aspect, the first implementation of the first aspect, or the second implementation of the first aspect, in a third implementation of the first aspect, the method further includes: measuring, by the sender device, load of traffic sent by the plurality of intermediate devices to the sender device; and sending, by the sender device to the target device, the load of the traffic sent by the plurality of intermediate devices to the sender device. The target device records the load, and selects, when forwarding a to-be-forwarded data packet of the new flowlet, a forwarding path based on the load and load of traffic sent to the plurality of intermediate devices and measured by the target device.

With reference to the third implementation of the first aspect, in a fourth implementation of the first aspect, the sender device sends, to the target device by using a control packet, the load of the traffic sent by the plurality of intermediate devices to the sender device. A customized packet format may be used when the control packet is used to send a measurement result. In addition, the measurement result may be sent at any time, and there is no need to wait for a data packet to be sent to the target device. Therefore, the implementation is flexible.

With reference to the third implementation of the first aspect, in a fifth implementation of the first aspect, the sending, by the sender device to the target device, the load of the traffic sent by the plurality of intermediate devices to the sender device includes: adding, by the sender device to the data packet, load of traffic sent by at least one of the plurality of intermediate devices to the sender device and a corresponding path identifier, where the corresponding path identifier is used to identify an intermediate device corresponding to each load in the load of the traffic sent by the at least one intermediate device to the sender device. Because the measurement result is sent by using the data packet, there is no need to design a new packet format and/or protocol. Because the existing data packet is used to carry the measurement result, a quantity of packets in a network is not increased additionally, and overheads are low. Therefore, the implementation is simple, and load is low.

With reference to any one of the third implementation of the first aspect to the fifth implementation of the first aspect, in a sixth implementation of the first aspect, load of traffic sent by a first intermediate device in the plurality of intermediate devices to the sender device is sent only when a change of the load of the traffic sent by the first intermediate device to the sender device is greater than a threshold. The implementation reduces bandwidth occupied by sending the measurement result.

With reference to any one of the first aspect, or the first implementation of the first aspect to the sixth implementation of the first aspect, in a seventh implementation of the first aspect, the load of each of the plurality of paths includes link load and a burst degree. A combination of the link load and the burst degree is used as a basis for path selection, and selection of a path that may be congested can be avoided before a congestion occurs.

According to a second aspect, a forwarding path selection device is provided. The forwarding path selection device includes modules for performing the method in the first aspect or any implementation of the first aspect.

According to a third aspect, a network device is provided. The network device includes a processor and a physical interface. The processor is configured to perform the method in the first aspect or any implementation of the first aspect.

According to a fourth aspect, a computer readable medium is provided. The computer readable medium stores a forwarding path selection program that may be executed by a computer. The program includes an instruction for performing the method in the first aspect or any implementation of the first aspect.

DESCRIPTION OF EMBODIMENTS

Embodiments of the present disclosure are hereinafter described with reference to FIG. 1 to FIG. 4.

Figure 1:
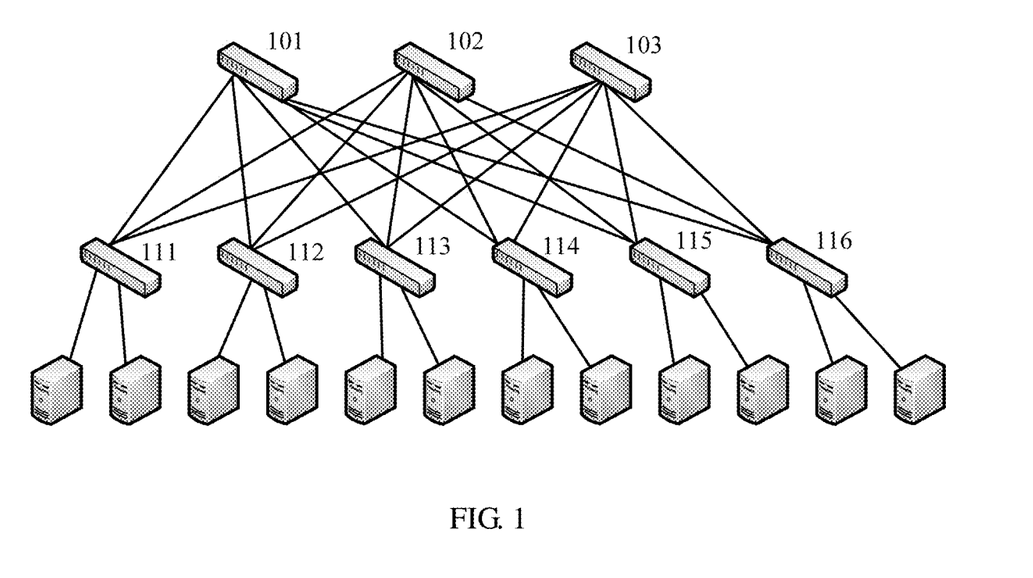
FIG. 1 is a schematic diagram of a network architecture according to an embodiment of the present disclosure.

FIG. 1 is a schematic diagram of a network architecture according to an embodiment of the present disclosure.

Network devices in FIG. 1 are grouped into two tiers (tier). A network device 101, a network device 102, and a network device 103 are in one tier. This tier may be referred to as a spine tier. The network devices in the spine tier may be referred to as spine devices. A network device 111, a network device 112, a network device 113, a network device 114, a network device 115, and a network device 116 are in the other tier. This tier may be referred to as a leaf tier. The network devices in the leaf tier may be referred to as leaf devices. The network architecture is also referred to as a flat network or a folded Clos network.

The network architecture may be used to establish a data center network. The network device in the network architecture may be a network switch or a router.

In this embodiment of the present disclosure, path selection is performed based on a flowlet. The flowlet is a burst of packets separated by a sufficiently long interval in a flow. The sufficiently long interval means that, the interval is so long that disorder of packets is not caused even if packets before and after the interval are sent separately through different paths.

Figure 2:
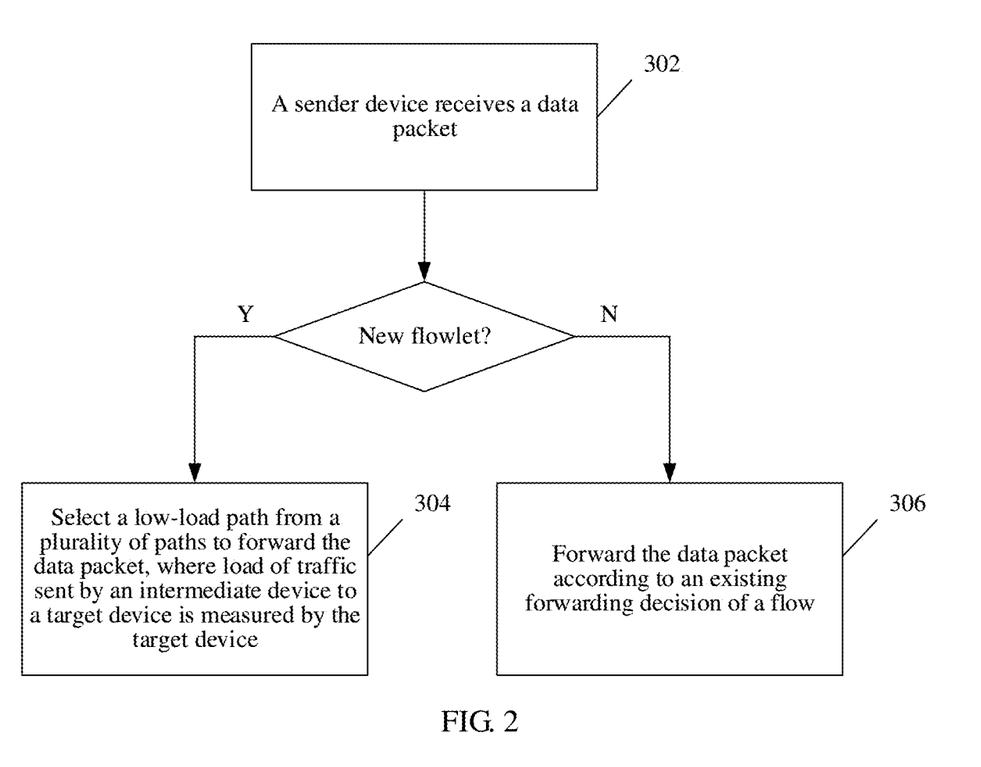
FIG. 2 is a flowchart of a forwarding path selection method according to an embodiment of the present disclosure.

FIG. 2 is a flowchart of a forwarding path selection method according to an embodiment of the present disclosure.

202. A sender device receives a first data packet to be sent to a target device. The first data packet is a data packet in a flow in which the first data packet is located. The flow is also referred to as a traffic flow, a stream, a packet flow, a network flow, or the like. The flow is a sequence of packets from a source device to a destination, for example, a sequence of packets with a same source address and a same destination address. The destination may be any host, a multicast group, or a broadcast domain.

The flow may be further defined by using a finer granularity. For example, packets with a same source address and a same destination address but different transport layer protocol port numbers belong to different flows. A transport layer protocol may be, for example, the Transmission Control Protocol (TCP) or the User Datagram Protocol (UDP).

The sender device and the target device are not a source device and a destination device of the data packet. The source device and the destination device of the data packet are usually terminal devices, but the sender device and the target device are network devices. The sender device and the target device are network devices in a same tier. For example, in FIG. 1, the sender device and the target device are leaf devices, and the source device and the destination device may be hosts (devices in the lowest row in FIG. 1) connected to the leaf devices. If the destination of the flow is a multicast group or a broadcast domain, there may be one or more target devices for the flow. If there are a plurality of target devices, the sender device replicates the data packet to obtain a plurality of same data packets. Each data packet is sent to one of the plurality of target devices. The sender device uses the method in this embodiment of the present disclosure to select a forwarding path for each data packet.

Roles of the sender device and the target device are not fixed, but correspond to packets to be forwarded. Using FIG. 1 as an example, if a packet A needs to be sent from the leaf device 113 to the leaf device 115, a sender device and a target device for the packet A are the leaf device 113 and the leaf device 115 respectively. If a packet B needs to be sent from the leaf device 115 to the leaf device 113, a sender device and a target device for the packet B are the leaf device 115 and the leaf device 113 respectively.

204. If the first data packet is a start packet of a flowlet in which the first data packet is located, the sender device selects a low-load path from a plurality of paths to forward the first data packet, and sets a forwarding decision of the flow to the selected path.

If the first data packet is a start packet of the flow in which the first data packet is located or an interval between the first data packet and a second data packet is longer than an invalid duration, the first data packet is the start packet of the flowlet in which the first data packet is located. The second data packet is a data packet previous to the first data packet in the flow. The invalid duration is an interval that is sufficiently long to separate the two data packets in the flow to different flowlets. If the first data packet is the start packet of the flowlet in which the first data packet is located, the flowlet is a new flowlet.

The forwarding decision is an entry stored in the sender device and corresponding to the flow. After selecting a forwarding path for the data packet, the sender device stores the selected forwarding path in the forwarding decision corresponding to the flow.

If the first data packet is the start packet of the flow in which the first data packet is located, the flowlet is a first flowlet of the flow to which the first data packet belongs. Therefore, the forwarding decision of the flow does not exist. The sender device selects a forwarding path for the new flowlet.

If the interval between the first data packet and the second data packet is longer than the invalid duration, the flowlet in which the first data packet is located is not a first flowlet of the flow to which the first data packet belongs. Even if another (old) flowlet exists before the new flowlet in the flow, the sender device selects a forwarding path for the new flowlet separately, without depending on an existing forwarding decision (made by the sender device for the old flowlet) of the flow. The sender device sets the forwarding decision of the flow to the forwarding path selected by the sender device for the new flowlet, so that when receiving a subsequent data packet of the new flowlet, the sender device forwards the subsequent data packet based on the forwarding decision (made by the sender device for the new flowlet) of the flow.

Because all values in a computer are discrete, determining that the interval is longer than the invalid duration may be based on the interval, where the interval is longer than the invalid duration or the interval is longer than or equal to another duration. The another duration is another discrete value greater than the invalid duration, and no other discrete value exists between the discrete value and the invalid duration.

Each of the plurality of paths connects the sender device to the target device via one of a plurality of intermediate devices. Relationships between the plurality of paths and the plurality of intermediate devices are bijective. Therefore, any intermediate device corresponds to a unique path, and any path corresponds to a unique intermediate device. An intermediate device is a network device connected to the sender device and the target device. A tier in which the intermediate device is located is different from the tier in which the sender device and the target device are located. Using FIG. 1 as an example, the intermediate device is a spine device in FIG. 1. The relationships between the plurality of paths and the plurality of intermediate devices are bijective. The sender device may record the selected path by using a path name, an identifier of the intermediate device, or an identifier of a physical interface in the forwarding decision of the flow. A path name is an identifier negotiated or specified by the network device for each path. The identifier of the intermediate device may be an address of the intermediate device, an identifier fixed before the intermediate device is delivered from a factory, or an identifier negotiated or specified by another network device for the intermediate device. The identifier of the physical interface is an identifier of a physical interface, connected to the intermediate device, in a plurality of physical interfaces of the sender device.

Load of each of the plurality of paths is load of traffic received by an intermediate device corresponding to the path from the sender device or load of traffic sent by the corresponding intermediate device to the target device, whichever is higher. A path from the sender device to the target device includes two paths (a path for connecting the sender device to the intermediate device, and a path for connecting the target device to the intermediate device). If either of the two paths is congested, packet forwarding is affected. Therefore, whichever of the two paths has higher load, the higher load is used as load of the path from the sender device to the target device. The foregoing traffic is traffic of all packets sent or received by the corresponding intermediate device on the path, and is not traffic of any flow.

The load of each path includes link load, or a combination of link load and a burst degree. The link load indicates an average value of load of traffic in a link, and the burst degree indicates a degree of traffic imbalance in the link. Values of the link load and the burst degree may be indicated by actual values (for example, bits per second or bytes per second) or may be indicated by a percentage of traffic to a link capacity, or one of the values may be indicated by an actual value, and the other value may be indicated by a percentage in a link capacity. The link capacity of the path indicates a maximum transmission rate of the path. Optionally, the values of the link load and the burst degree may be further indicated by several levels to facilitate recording of a measurement result or sending of a measurement result in a packet. For example, if the values of the link load and the burst degree are ratios, and a field indicating the measurement result in the packet occupies three bits, the measurement result is converted to eight levels. If a ratio corresponding to each level changes evenly, each level corresponds to 12.5%, a value corresponding to the link load or the burst degree 0-12.5% is 0, a value corresponding to 12.6%-25% is 1, and so on. If the load of the path includes the combination of the link load and the burst degree, optionally, the sender device calculates an indicator of the load of each path based on weights of the link load and the burst degree of each path, to select a low-load path. A high burst degree means that traffic in the path changes intensively. By adding the determination of the burst degree for load balancing, selection of a path that may be congested can be avoided before a congestion occurs.

The sender device may select a low-load path from the plurality of paths by using a relative condition, an absolute condition, or a combination thereof. The relative condition is a condition of a load relationship of the plurality of paths. For example, a path with lowest load is selected from the plurality of paths, or a path is randomly selected from two or more paths with lowest load in the plurality of paths, or a path with a lowest burst degree is selected from two or more paths with lowest link load. The absolute condition is a condition that load of a selected path needs to satisfy. For example, a path is randomly selected from paths whose load is lower than a threshold; or a selection probability is generated based on the load of each path, and a path is selected based on the probability, where a probability of selecting a low-load path is high. A combination of the relative condition and the absolute condition is: for example, if there are paths whose load is lower than the threshold, a path is selected from the paths, or if there is no path whose load is lower than the threshold, a path with lowest load is selected. For another example, a path with a lowest burst degree is selected from paths whose link load is lower than a threshold, or a path whose link load is the lowest is selected from paths whose burst degrees are lower than a threshold. Further, on the sender device, "randomly selecting a path" in the foregoing condition may be replaced with "if paths (for example, two or more paths with lowest load, or paths whose load is lower than the threshold) satisfying other conditions include a path selected by the sender device for the old flowlet, selecting the path; otherwise, randomly selecting a path".

For example, the network device periodically measures data volume of packets sent or received through a link, and updates link load. If the link load is an actual value, and a period is T, and link load obtained in a previous measurement is P1, and data volume of packets sent or received through the link between the previous measurement and a current measurement is X, currently updated link load $P2=P1*a+X*(1-a)/T$, a is an attenuation coefficient. If the link load is a ratio, and the link capacity is C, and other parameters remain unchanged, the currently updated link load $P2=P1*a+X*(1-a)/(T*C)$.

The burst degree is a data volume or ratio of a path within a short time. Alternatively, the burst degree is a change intensity degree of data volumes or ratios obtained by performing a plurality of measurements, for example, a variance or a standard deviation of data volumes or ratios obtained by performing a plurality of measurements. A duration corresponding to the burst degree is usually short in a microsecond range. For example, if the burst degree is an actual value, and the duration is D, and data volume of packets sent or received through the link within the duration is Y, the burst degree $B=Y/D$. If the burst degree is a ratio, and the link capacity is C, and other parameters remain unchanged, the burst degree $B=Y/(D*C)$.

Because a packet is sent from one network device to another network device, a quantity of packets sent by one network device is equal to a quantity of packets received by another network device. Load of traffic from one network device to another network device may be measured by either of the network devices. For example, load of traffic from the leaf device 113 to the spine device 102 in FIG. 1 may be obtained by the leaf device 113 by measuring the traffic sent by the leaf device 113 to the spine device 102, or may be obtained by the spine device 102 by measuring the traffic received by the spine device 102 from the leaf device 113. However, because functions and capacity requirements of the leaf device and the spine device are different, network devices of different types are usually used as the leaf device and the spine device. Therefore, types of the sender device and the target device are usually different from types of the intermediate devices. To simplify the intermediate devices, in this embodiment of the present disclosure, the sender device and the target device measure and send load. Load of traffic received by the plurality of intermediate devices from the sender device is measured by the sender device. Load of traffic sent by the plurality of intermediate devices to the target device is measured by the target device. The sender device receives, from the target device, the load of the traffic sent by the plurality of intermediate devices to the target device and measured by the target device. The intermediate devices are only responsible for forwarding.

206. If the first data packet belongs to an old flowlet, the sender device forwards the first data packet based on the forwarding decision of the flow in which the first data packet is located.

If the interval between the first data packet and the previous data packet is not longer than the invalid duration, the first data packet belongs to the old flowlet. That the data packet belongs to the old flowlet means that the data packet is not the start packet of the flowlet. To avoid packet disorder, the sender device uses the path selected by the sender device for the old flowlet in the existing forwarding decision of the flow to forward the first data packet.

For example, the leaf device 111 in FIG. 1 receives a data packet to be sent to a host connected to the leaf device 116. The leaf device 111 used as a sender device needs to send the data packet only to the leaf device 116. Therefore, the leaf device 116 is a target device. The leaf device 111 may send the data packet to the leaf device 116 through a plurality of paths. The plurality of paths are a path passing through the spine device 101, a path passing through the spine device 102, and a path passing through the spine device 103. Load of each path is load of traffic received by a corresponding spine device from the leaf device 111 or load of traffic sent by a corresponding spine device to the leaf device 116, whichever is higher. For example, load of the path passing through the spine device 101 is load of traffic received by the spine device 101 from the leaf device 111 or load of traffic sent by the spine device 101 to the leaf device 116, whichever is higher. During reception of the data packet, if the interval between the data packet and the data packet previous to the data packet in the same flow is longer than a flowlet interval, or the data packet is the start packet of the flow in which the data packet is located, the data packet is a start packet of a new flowlet. The flowlet interval is a duration in which a path selected for an old flowlet is invalid. The leaf device 111 selects a low-load path from the plurality of paths to forward the data packet. During reception of the data packet, if the interval between the data packet and a data packet previous to the data packet in the same flow is less than the flowlet interval, the data packet is in the old flowlet. The leaf device 111 sends the data packet based on a path selection result of the old flowlet.

There are a plurality of methods for determining whether the first data packet belongs to a new flowlet. This embodiment of the present disclosure provides two implementations.

Implementation 1

The sender device records, for each flow, a time of receiving a last data packet of the flow. When a new data packet of the flow is received, the sender device calculates a difference between a time of receiving the new data packet and a time, recorded by the sender device, of receiving a previous data packet of the flow. The difference is an interval between two data packets of the flow, for example, an interval between the first data packet and the second data packet. If the difference is greater than the invalid duration, or the sender device has not recorded a time of receiving a data packet of the flow, the new data packet belongs to a new flowlet. If the difference is not greater than the invalid duration, the new data packet belongs to an old flowlet.

Implementation 2

After a data packet of a flow is received, if the sender device does not receive any data packet of the flow within the invalid duration, the sender device invalidates a forwarding decision of the flow. The sender device may set a timer for each flow, and the timer expires after the invalid duration. When a timer of a flow expires, the sender device invalidates a forwarding decision of the flow. The forwarding decision of the flow is invalidated when the sender device does not receive any data packet within the invalid duration, so that the sender device does not need to calculate an interval between two data packets every time a data packet is received. This reduces calculation of the sender device.

The sender device may set a validity flag for a forwarding decision of each flow, where a value of the validity flag indicates whether a corresponding forwarding decision is valid. For example, the value of the validity flag is 0 or 1. If the value of the validity flag is 0, it indicates that the corresponding forwarding decision is valid. If the value of the validity flag is 1, it indicates that the corresponding forwarding decision is invalid. The sender device may alternatively delete the forwarding decision of the flow to invalidate the forwarding decision. That the value of the validity flag of the forwarding decision of the flow indicates that the forwarding decision is invalid and that the forwarding decision of the flow does not exist both mean that the forwarding decision of the flow is invalid. If the sender device determines validity of the forwarding decision of the flow by setting the validity flag, after selecting the path for forwarding the first data packet, the sender device sets the forwarding decision of the flow to "valid".

If the forwarding decision of the flow is invalid when the sender device receives the first data packet, it indicates that the first data packet is the start packet of the flow or that the interval between the first data packet and the second data packet is longer than the invalid duration. If the forwarding decision of the flow is invalid when the sender device receives the first data packet, the first data packet belongs to the new flowlet. If the forwarding decision of the flow is valid when the sender device receives the first data packet, the first data packet belongs to the old flowlet.

In this embodiment of the present disclosure, the sender device and the target device respectively measure load of traffic sent and load of traffic received on the path connected to the intermediate device. For example, the sender device measures load of traffic sent by the sender device to the plurality of intermediate devices, and may also measure load of traffic sent by the plurality of intermediate devices to the sender device. Using the network architecture in FIG. 1 as an example, the leaf device 111 measures load of traffic sent by the leaf device 111 to the spine device 101, load of traffic sent by the leaf device 111 to the spine device 102, load of traffic sent by the leaf device 111 to the spine device 103, load of traffic sent by the spine device 101 to the leaf device 111, load of traffic sent by the spine device 102 to the leaf device 111, and load of traffic sent by the spine device 103 to the leaf device 111. The sender device records load of traffic sent by the sender device to the plurality of intermediate devices, where the load is obtained by the sender device by performing measurements, and used for the sender device to select a forwarding path. The sender device sends, to other network devices (including the target device) in the same tier, load of traffic sent by the plurality of intermediate devices to the sender device, where the load is obtained by the sender device by performing measurements. Operations of measuring load by the other network devices are the same as the operation of measuring the load by the sender device. A network device receiving the load of the traffic of each path, measured by the sender device, records the load, and when forwarding a to-be-forwarded data packet of the new flowlet, selects a forwarding path based on the load and load that is measured by the network device. The other network devices also send measurement results after measuring the load.

For example, the target device receives load of traffic sent by the plurality of intermediate devices to the sender device and measured by the sender device. The target device itself also measures load of traffic sent by the target device to the plurality of intermediate devices. Load of any path between the target device and the sender device is received load of traffic sent by a corresponding intermediate device to the sender device and measured by the sender device or load of traffic sent by the target device to a corresponding intermediate device and measured by the target device, whichever is higher. When the sender device receives the to-be-forwarded packet of the new flowlet, the sender device selects a forwarding path for the to-be-forwarded packet based on the load of each path.

The network devices (including the sender device and the target device) in the tier may use a control packet to send the load measured by the network devices, or may add a measurement result to the to-be-forwarded data packet. A customized packet format may be used when the control packet is used to send the measurement result. In addition, the measurement result may be sent at any time, and there is no need to wait for a data packet to be sent to the other network devices. Therefore, the implementation is flexible. Because the measurement result is sent by using the data packet, there is no need to design a new packet format and/or protocol. Because the existing data packet is used to carry the measurement result, a quantity of packets in a network is not increased additionally, and overheads are low. Therefore, the implementation is simple, and load is low. Optionally, to reduce bandwidth occupied by sending the measurement result, the network device sends, only when a change of load of traffic sent by one or more intermediate devices to the network device is greater than a threshold, the load of the traffic sent by the one or more intermediate devices to the network device.

In the implementation of adding the measurement result to the control packet, when the sender device needs to send the measurement result, the sender device generates a control packet to be sent to other network devices in the same tier. The control packet includes load of traffic sent by at least one of the plurality of intermediate devices to the sender device and a corresponding path identifier.

The path identifier is used to identify an intermediate device corresponding to each load in the load of the traffic sent by the at least one intermediate device to the sender device. The path identifier may be a path name, an identifier of the intermediate device, or an identifier of a physical interface. In the packet, a type of the path identifier used to identify the path may be different from a type of an identifier of the selected path recorded in the forwarding decision of the flow. For example, in the forwarding decision of the flow, an identifier of a physical interface is used to record the selected path, but in each measurement result in the packet, the identifier of the intermediate device is used for distinguishing.

In the implementation of adding the measurement result to the to-be-forwarded data packet, the sender device adds, to the first data packet, load of traffic sent by at least one of the plurality of intermediate devices to the sender device and a corresponding path identifier. The sender device may add, to a data packet, load of traffic of a single path in which an intermediate device is located, or may add a plurality of measurement results at a time. The measurement result added by the sender device may include a measurement result related to the path for forwarding the data packet, or may include measurement results related to other paths.

For example, a measurement result and a path identifier may be carried in a reserved field in a virtual extensible local area network (Virtual Extensible Local Area Network, VXLAN) header.

Figure 3:
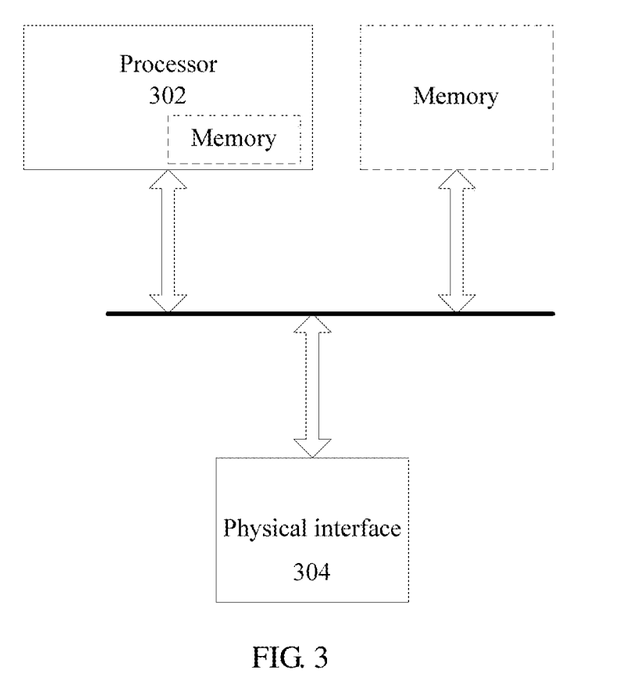
FIG. 3 is a structural diagram of a network device according to an embodiment of the present disclosure.

FIG. 3 is a structural diagram of a network device according to an embodiment of the present disclosure.

The network device includes a processor 302 and a physical interface 304. The processor 302 is connected to the physical interface 304. For example, the processor 302 and the physical interface 304 may be connected by a bus.

The processor 302 may be a central processing unit (CPU), a network processor (NP), a hardware chip, or any combination thereof. The hardware chip may be a disclosure-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The physical interface 304 may be a wired physical interface. The wired physical interface may be, for example, one or more Ethernet interfaces. The Ethernet interface may be an optical interface, an electrical interface, or a combination thereof. The physical interface 304 is configured to communicate with another network device (for example, an intermediate device) or a host.

The network device may further include a memory. The memory may be an independent component or may be integrated in the processor 302. The memory may include a volatile memory, for example, a random access memory (RAM). The memory may also include a non-volatile memory, for example, a read-only memory (ROM), a flash memory, an optical disc, a magnetic tape, a floppy disk, a hard disk, or a solid state drive. The memory may further include any combination of the foregoing types of memories. The memory may be configured to store a forwarding decision, a setting of a validity flag of the forwarding decision, load of each of a plurality of paths, and the like. If the processor 302 includes a CPU, the memory may further store program code and transmit the program code to the CPU, so that the CPU implements this embodiment of the present disclosure based o an instruction of the program code.

The processor 302 is configured to receive, by using the physical interface 304, a data packet to be sent to a target device, and is further configured to: if the data packet is a start packet of a flowlet in which the data packet is located, select a low-load path from a plurality of paths to forward the data packet, and set a forwarding decision of a flow in which the data packet is located to the selected path. Each of the plurality of paths connects the network device to the target device via one of a plurality of intermediate devices. Load of each of the plurality of paths is load of traffic received by a corresponding intermediate device from the network device or load of traffic sent by a corresponding intermediate device to the target device, whichever is higher. Load of traffic received by the plurality of intermediate devices from the network device is measured by the network device. Load of traffic sent by the plurality of intermediate devices to the target device is measured by the target device.

For implementation details of the processor 302, refer to details in the forwarding path selection method shown in FIG. 2.

Figure 4:
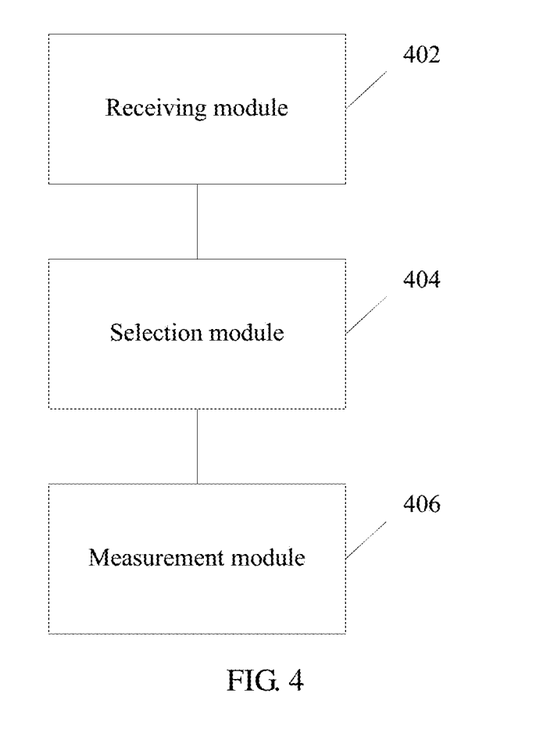
FIG. 4 is a structural diagram of a forwarding path selection device according to an embodiment of the present disclosure.

FIG. 4 is a structural diagram of a forwarding path selection device according to an embodiment of the present disclosure. The device includes a receiving module 402, a selection module 404, and a measurement module 406.

The receiving module 402 is configured to receive a data packet to be sent to a target device.

The selection module 404 is configured to: if the data packet is a start packet of a flowlet in which the data packet is located, select a low-load path from a plurality of paths to forward the data packet, and set a forwarding decision of a flow in which the data packet is located to the selected path. Each of the plurality of paths connects the forwarding path selection device to the target device via one of a plurality of intermediate devices. Load of each of the plurality of paths is load of traffic received by a corresponding intermediate device from the forwarding path selection device or load of traffic sent by a corresponding intermediate device to the target device, whichever is higher. Load of traffic sent by the plurality of intermediate devices to the target device is measured by the target device.

The measurement module 406 is configured to measure load of traffic received by the plurality of intermediate devices from the forwarding path selection device.

For implementation details of each module, refer to details in the forwarding path selection method shown in FIG. 2.

A person of ordinary skill in the art may understand that all or a part of the steps of the method embodiments may be completed by a program instructing a processor. The program may be stored in a computer readable storage medium. The storage medium may include: a random access memory, a read-only memory, a flash memory, a hard disk, a solid state disk, a magnetic tape, a floppy disk, an optical disc, or any combination thereof.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A forwarding path selection method, comprising:
   receiving, by a sender device, a data packet to be sent to a target device; and
   selecting, by the sender device, a low-load path from a plurality of paths to forward the data packet when the data packet is a start packet of a flowlet in which the data packet is located, wherein each of the plurality of paths connects the sender device to the target device via one of a plurality of intermediate devices, wherein a load of each of the paths is of traffic from the sender device to an intermediate node or of traffic from an intermediate device to the target device, whichever is higher; load of traffic received by the plurality of intermediate devices from the sender device is measured by the sender device; and load of traffic sent by the plurality of intermediate devices to the target device is measured by the target device; and
   setting, a forwarding decision of a flow in which the data packet is located to the low-load path.

2. The method according to claim 1, further comprising determining that the data packet is the start packet of the flowlet in which the data packet is located when the forwarding decision of the flow is invalid.

3. The method according to claim 2, wherein after selecting the path for forwarding the data packet, the method further comprises setting, by the sender device, a validity flag of the forwarding decision of the flow to "valid".

4. The method according to claim 3, further comprising invalidating, by the sender device, the forwarding decision of the flow when the sender device does not receive any data packet of the flow within an invalid duration after the data packet is received.

5. The method according to claim 1, further comprising:
measuring, by the sender device, a load of traffic from the plurality of intermediate devices to the sender device; and
sending, by the sender device to the target device, the load of the traffic from the plurality of intermediate devices to the sender device.

6. The method according to claim 5, wherein sending, by the sender device to the target device, the load of the traffic from the plurality of intermediate devices to the sender device comprises adding, by the sender device to the data packet, load of traffic from at least one of the plurality of intermediate devices to the sender device and a corresponding path identifier, and wherein the corresponding path identifier identifies an intermediate device corresponding to each load in the load of the traffic from the at least one of the plurality of intermediate devices to the sender device.

7. The method according to claim 5, wherein load of traffic from one or more of the plurality of intermediate devices to the sender device is sent only when a change of the load of the traffic from the one or more of the plurality of intermediate devices to the sender device is greater than a threshold.

8. The method according to claim 1, wherein the load of each of the plurality of paths comprises a link load and a burst degree.

9. A network device, comprising:
a physical interface; and
a processor coupled to the physical interface, wherein the processor is configured to:
receive, using the physical interface, a data packet to be sent to a target device;
select a low-load path from a plurality of paths to forward the data packet when the data packet is a start packet of a flowlet in which the data packet is located, wherein each of the plurality of paths connects the sender device to the target device via one of a plurality of intermediate devices, wherein a load of each of the paths is of traffic from the sender device to an intermediate node or of traffic from an intermediate device to the target device, whichever is higher; load of traffic received by the plurality of intermediate devices from the sender device is measured by the sender device; and load of traffic sent by the plurality of intermediate devices to the target device is measured by the target device; and
set a forwarding decision of a flow in which the data packet is located to the low-load path.

10. The network device according to claim 9, wherein the processor is further configured to determine, when the forwarding decision of the flow is invalid, that the data packet is the start packet of the flowlet in which the data packet is located.

11. The network device according to claim 10, wherein the processor is further configured to set a validity flag of the forwarding decision of the flow to "valid" after selecting the path for forwarding the data packet.

12. The network device according to claim 11, wherein the processor is further configured to invalidate the forwarding decision of the flow when the network device does not receive any data packet of the flow within an invalid duration after the data packet is received.

13. The network device according to claim 9, wherein the processor is further configured to:
measure a load of traffic from the plurality of intermediate devices to the network device; and
send, to the target device using the physical interface, the load of the traffic from the plurality of intermediate devices to the network device.

14. The network device according to claim 13, wherein the processor is further configured to add, to the data packet, load of traffic from at least one of the plurality of intermediate devices to the network device and a corresponding path identifier, and wherein the corresponding path identifier identifies an intermediate device corresponding to each load in the load of the traffic from the at least one of the plurality of intermediate devices to the network device.

15. The network device according to claim 13, wherein the processor is further configured to send, only when a change of load of traffic from one or more of the plurality of intermediate devices to the network device is greater than a threshold, the load of the traffic from the one or more of the plurality of intermediate devices to the network device.

16. The network device according to claim 9, wherein the load of each of the plurality of paths comprises a link load and a burst degree.

17. A network, comprising:
a target device; a plurality of intermediate devices; and
a sender device configured to:
receive a data packet to be sent to the target device;
select a low-load path from a plurality of paths to forward the data packet when the data packet is a start packet of a flowlet in which the data packet is located, wherein each of the plurality of paths connects the sender device to the target device via one of a plurality of intermediate devices, wherein a load of each of the paths is of traffic from the sender device to an intermediate node or of traffic from an intermediate device to the target device, whichever is higher; load of traffic received by the plurality of intermediate devices from the sender device is measured by the sender device; and load of traffic sent by the plurality of intermediate devices to the target device is measured by the target device; and
set a forwarding decision of a flow in which the data packet is located to the low-load path.

18. The network according to claim 17, wherein the sender device is further configured to determine, when the forwarding decision of the flow is invalid, that the data packet is the start packet of the flowlet in which the data packet is located.

19. The network according to claim 18, wherein the sender device is further configured to set a validity flag of the forwarding decision of the flow to "valid" after selecting the path for forwarding the data packet.

20. The network device according to claim 19, wherein the sender device is further configured to invalidate the forwarding decision of the flow when the network device does not receive any data packet of the flow within an invalid duration after the data packet is received.

* * * * *